United States Patent
Herrick et al.

(10) Patent No.: US 8,106,917 B2
(45) Date of Patent: Jan. 31, 2012

(54) METHOD AND SYSTEM FOR MOSAIC MODE DISPLAY OF VIDEO

(75) Inventors: Jason Herrick, Newark, CA (US);
Darren Neuman, Palo Alto, CA (US);
Hongtao Zhu, Union City, CA (US);
Philip Truong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1128 days.

(21) Appl. No.: 11/515,562

(22) Filed: Sep. 5, 2006

(65) Prior Publication Data
US 2008/0001970 A1 Jan. 3, 2008

Related U.S. Application Data (60) Provisional application No. 60/817,381, filed on Jun. 29, 2006.

(51) Int. Cl.
*G09G 5/36* (2006.01)
(52) U.S. Cl. ........................... 345/547; 345/559
(58) Field of Classification Search .................. 345/629, 345/630, 632, 634, 547, 559
See application file for complete search history.

(56) References Cited

U.S. PATENT DOCUMENTS

| | | | |
|---|---|---|---|
| 5,539,464 A * | 7/1996 | Xu et al. | 348/388.1 |
| 6,538,656 B1 * | 3/2003 | Cheung et al. | 345/519 |
| 6,573,905 B1 * | 6/2003 | MacInnis et al. | 345/629 |
| 6,870,538 B2 * | 3/2005 | MacInnis et al. | 345/505 |
| 2003/0223731 A1 * | 12/2003 | Carlsgaard et al. | 386/46 |
| 2004/0078501 A1 * | 4/2004 | Law et al. | 710/52 |
| 2004/0179815 A1 * | 9/2004 | DaSilva | 386/46 |
| 2005/0162557 A1 * | 7/2005 | Choi | 348/565 |
| 2006/0055710 A1 * | 3/2006 | Lo et al. | 345/629 |

* cited by examiner

*Primary Examiner* — Kee M Tung
*Assistant Examiner* — Robert Craddock
(74) *Attorney, Agent, or Firm* — Thomas, Kayden, Horstemeyer & Risley, LLP.

(57) ABSTRACT

Methods and systems for mosaic mode display of video are disclosed. Aspects of one method may include generating video data for a plurality of video windows using a single video feeder module comprising a single video scaler and a single video capture module. The video data for the video windows may be generated in a single frame time. Register DMA may be used to transfer register update data (RUD) to a plurality of registers to configure video processing for generating video data for a video window. The plurality of RUDs may be generated in response to a single interrupt to a processor, and may be configured as a linked list or stored sequentially in memory. The configuring may occur prior to generating video data for the corresponding video window. Video processing for a subsequent video window may be configured automatically after generating video data for the present video window.

30 Claims, 11 Drawing Sheets

METHOD AND SYSTEM FOR MOSAIC MODE DISPLAY OF VIDEO

CROSS-REFERENCE TO RELATED APPLICATIONS/INCORPORATION BY REFERENCE

This patent application makes reference to, claims priority to and claims benefit from U.S. Provisional Patent Application Ser. No. 60/817,381 filed on Jun. 29, 2006.

This application also makes reference to:
U.S. patent application Ser. No. 10/314,525 filed on Dec. 9, 2002;
U.S. patent application Ser. No. 10/300,370 filed on Nov. 20, 2002;
U.S. patent application Ser. No. 10/386,313 filed on Mar. 11, 2003; and
U.S. patent application Ser. No. 11/015,443 filed on Dec. 17, 2004.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to video processing. More specifically, certain embodiments of the invention relate to a method and system for mosaic mode display of video.

BACKGROUND OF THE INVENTION

In some conventional systems, a video display, for example, a television set, may display information for a single channel at a time. However, more advanced television sets may have a picture-in-picture display capability. That is, the television set may display most of the information for a first channel on a television screen, while a smaller portion of the television screen may be used to display a second channel. In this manner, a viewer may possess the capability to watch the first channel while still able to see the contents of the second channel. This may allow the viewer to switch to the second channel when a program of interest is displayed on the second channel. The second channel may then be displayed on most of the television screen, while the smaller portion of the television screen may be used to display the first channel.

Similarly, set-top boxes may allow picture-in-picture capability by providing video processing capability of the channels transmitted, for example, via a cable or a satellite. Depending on the capability of the set-top box, more than one channel may be displayed in a picture-in-picture mode. However, updating each picture-in-picture (PIP) channel at a full-frame rate may require separate video processing circuitry for each channel displayed in PIP mode. This may not be desirable because of the additional cost associated with providing a plurality of video processing circuitry needed for separate PIP channels.

Alternatively, a single video processing circuitry may be used to update each picture-in-picture channel. However, this may not be desirable because the video processing circuitry may process one channel during a single frame time. Accordingly, if there are N channels displayed on the television screen, the frame display rate may be reduced to (1/N)*(full frame rate). Accordingly, the video on the picture-in-picture channels may appear "jerky."

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for mosaic mode display of video, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for mosaic mode display of video. Aspects of the method may comprise generating video data for a plurality of video windows using a single video feeder module, where the video data for the plurality of video windows may be generated in a single frame time. The video feeder module may, for example, comprise a single video scaler and/or a single video capture module, which may also be referred to as a capture block. Each register update data may correspond to a video compositor and to a different video window, which may be displayed on a single display. Register direct memory access (RDMA) may be used to transfer register update data to a plurality of registers to configure video processing in order to generate video data for the corresponding video window.

The register update data for corresponding video windows may be generated in response to a single interrupt. The register update data may be configured as a linked list or stored sequentially in order to display a plurality of video windows in a single frame time. Register update data for configuring video processing may be used to update video processing registers via the RDMA prior to generating video data for the corresponding video window. Video processing for a subsequent video window may be updated automatically with appropriate register update data after processing data for the present video window.

Figure 1:
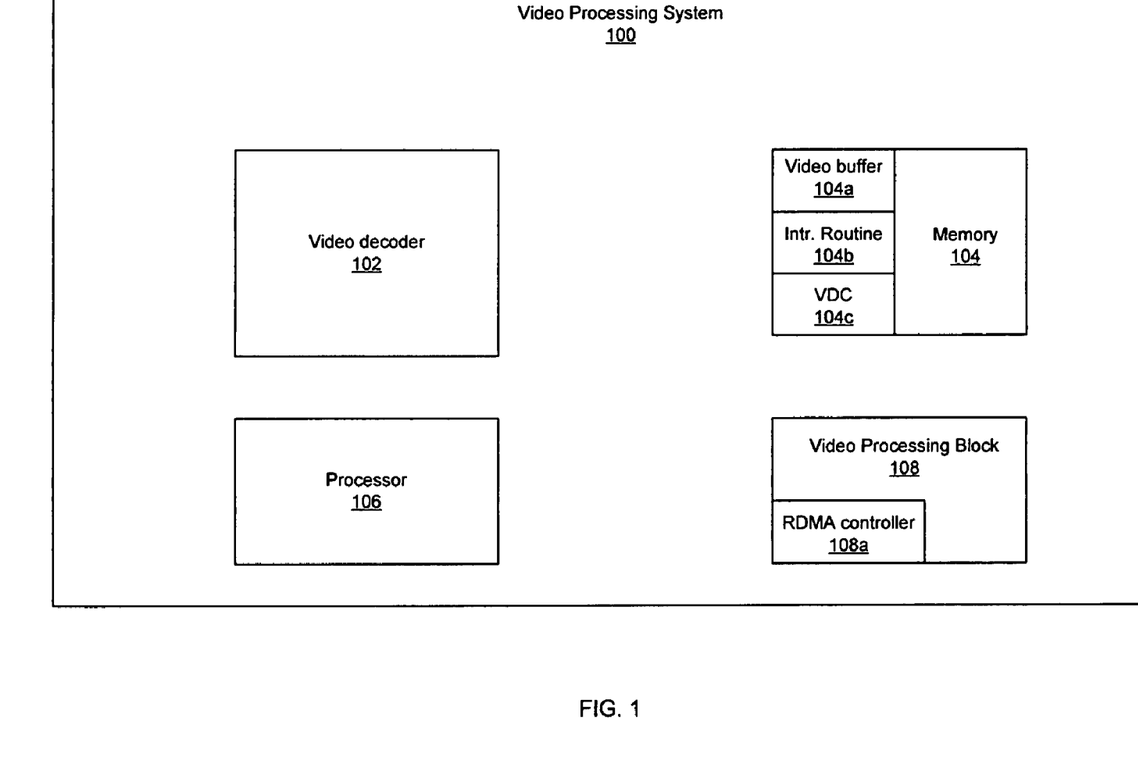
FIG. 1 is a block diagram of an exemplary system for video processing, in accordance with an embodiment of the invention.

FIG. 1 is a block diagram of an exemplary system for video processing, in accordance with an embodiment of the invention. Referring to FIG. 1, there is shown a video processing system 100, which may comprise a video decoder 102, memory 104, processor 106, and a video processor block 108. The video decoder 102 may comprise suitable logic, circuitry, and/or code that may enable decoding video data that may have been compressed. For example, the video data may have been compressed using H.264/MPEG4 advanced video coding (AVC) standard. In such instances, the video decoder 102 may use the H.264/MPEG4 AVC standard to decode the video. The memory 104 may comprise suitable logic and/or circuitry for storing data. The memory 104 may be used, for example, to store program code and/or video data. The memory 104 may comprise various types of technology, such as, for example, RAM, ROM, and FLASH, which may have suitable speed and capability to handle mosaic mode of display. The memory 104 may also comprise a video buffer 104a, an interrupt service routine 104b, and a video display control routine (VDC) 104c. The interrupt service routine 104b may comprise, for example, code that may be executed when the processor 106 is interrupted. The VDC 104c may comprise, for example, code that may be called by the interrupt service routine 104b to generate various register update data (RUD) that may be used to configure, for example, the video processing block 108. The RUDs and configuration of the video processing block 108 are discussed in more detail with respect to FIGS. 7-11.

The processor 106 may comprise suitable logic, circuitry, and/or code that may enable execution of code from, for example, the memory 104. The processor 106 may enable reading from and/or writing to various memory and register locations to control, for example, video decoding and/or video processing. The video processor block 108 may comprise suitable logic, circuitry, and/or code that may enable processing of decoded video data to generate video data that may be communicated to, for example, a television set (not shown) or a video monitor (not shown) in order to display the information in the video data. Accordingly, the video processing system 100 may be, for example, a cable set-top box, a satellite set-top box, or a television tuner.

The video processor block 108 may also comprise a RDMA controller 108a. The RDMA controller 108a may comprise suitable logic, circuitry, and/or code that may allow a plurality of registers to be written with information to appropriately process video signals. U.S. patent application Ser. No. 10/314,525 filed on Dec. 9, 2002 discloses the RDMA controller, and is incorporated herein by reference in its entirety. The plurality of registers may comprise various registers used by the video processing system 100. The processor 106 may configure the RDMA controller 108a such that it may be able to read data from memory, for example, the memory 104, and write that data to appropriate register or registers. Accordingly, the processor 106 may offload writing to registers to the RDMA controller 108a. Operation of the RDMA controller 108a is explained in more detail with respect to FIG. 11. While the RDMA controller 108a may be shown to be part of the video processor block 108, the invention need not be so limited. For example, the RDMA controller 108a may be designed as a separate circuitry, or as part of another circuit block.

In operation, the processor 106 may configure various portions of the video processing system 100 to decode and process video as desired. For example, the processor 106 may configure the video processor block 108 to scale the received video to a lower resolution. This may be done, for example, to reduce the bandwidth of a portion of a video display. The processor 106 may configure the RDMA controller 108a such that the RDMA controller may write the various registers in the video processing system 100 to correctly configure it for processing video. Configuring the RDMA controller 108a may comprise indicating a start and stop memory addresses that may contain data to be written to the various registers. The video decoder 102 may receive video data that may have been transmitted, for example, via a network connection. The video data, which may be encoded using the H.264/MPEG4 AVC standard may be decoded by the video decoder 102, and may be stored in a portion of the memory 104. The portion of memory that may store the decoded video data may be referred to as a memory buffer 104a. The video processor block 108 may read the video data from the memory buffer 104a and process it for output to, for example, a television or video monitor.

Figure 2:
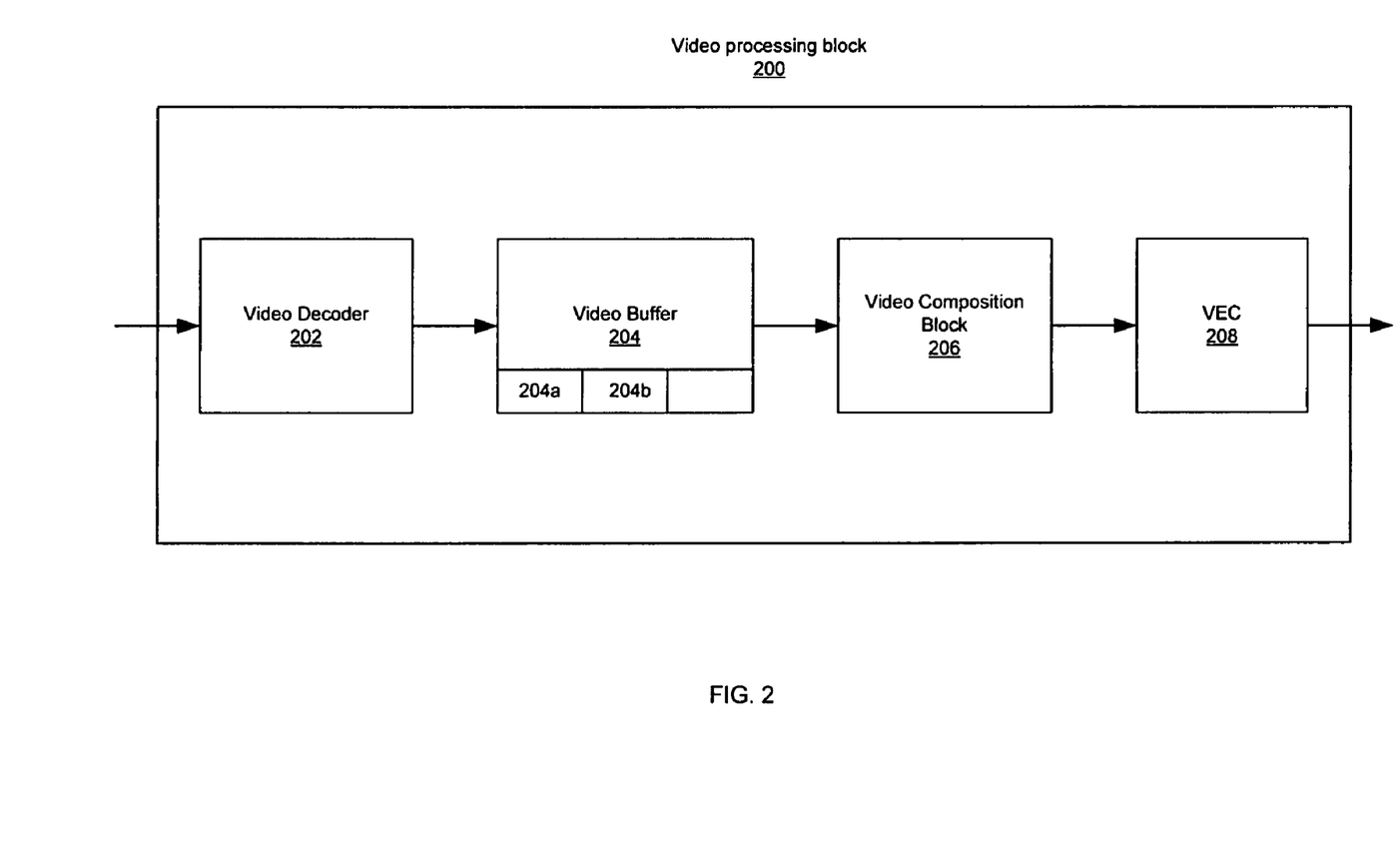
FIG. 2 is a block diagram illustrating an exemplary video processing block, in accordance with an embodiment of the invention.

FIG. 2 is a block diagram illustrating an exemplary video processing block, in accordance with an embodiment of the invention. Referring to FIG. 2, there is shown a video processing module 200 that may comprise a video decoder 202, a video buffer 204, a video composition block 206, and a video encoding block (VEC) 208. The video decoder 202 may be similar to the video decoder 102. The video buffer 204 may be similar to the video buffer 104a. The video composition block 206 may be similar to the video processor block 108. The VEC 208 may comprise suitable logic, circuitry, and/or code that may allow communicating the pixels to, for example, the television set or a video monitor, with correct timing to allow display of the video data. The VEC 208 may, for example, communicate the horizontal and vertical blank signals, where the horizontal and vertical blank signals may serve functions similar to horizontal and vertical synchronization signals for analog television set.

In operation, the video decoder 202 may decode video data that may have been encoded using, for example, the H.264/MPEG4 AVC standard. The decoded video data may be stored, for example, in the video buffer 204. A video frame may be used to refer to information used to display a picture on a television screen during a time from one vertical blank signal to the next vertical blank signal. Accordingly, a video frame may be used to refer to a frame in a progressive, non-interlaced video display mode, or to a field in an interlaced video display mode. While a number of video buffers used may depend on an embodiment of the invention, an embodiment of the invention may use two video buffers, such as, for example, the video buffers 204a and 204b. Accordingly, the video composition block 206 may read data from one video buffer while the video decoder 202 may write video data to the other video buffer.

The video composition block 206 may read the video data from, for example, the video buffer 204a and process it for output to, for example, a television set. The processing may comprise, for example, scaling a pixel resolution of the video and/or cropping of the frame. The pixel resolution may be up-scaled or down-scaled. For example, if the received video data is lower than can be displayed by the television, the video composition block 206 may up-scale the pixel rate to a higher pixel rate by appropriate digital signal processing. Conversely, the received video data may comprise a pixel rate that requires a display bandwidth greater than supported by the television and/or the video processing module 200. The video composition block 206 may be able to effectively "crop" the information in the video buffer 204, thus displaying a smaller portion of the image in the video buffer 204 and/or reduce the pixel rate by down-scaling.

The VEC 208 may communicate the video data from the video. composition block 206 with appropriate timing to be able to be displayed on, for example, the television set or the video monitor. The VEC 208 may also communicate the generated horizontal and/or vertical blank signals to the television set or the video monitor to indicate the end of a horizontal line and/or the end of a frame. The vertical blank signal may also be used by other functionalities, such as, for example, register DMA transfers.

Figure 3:
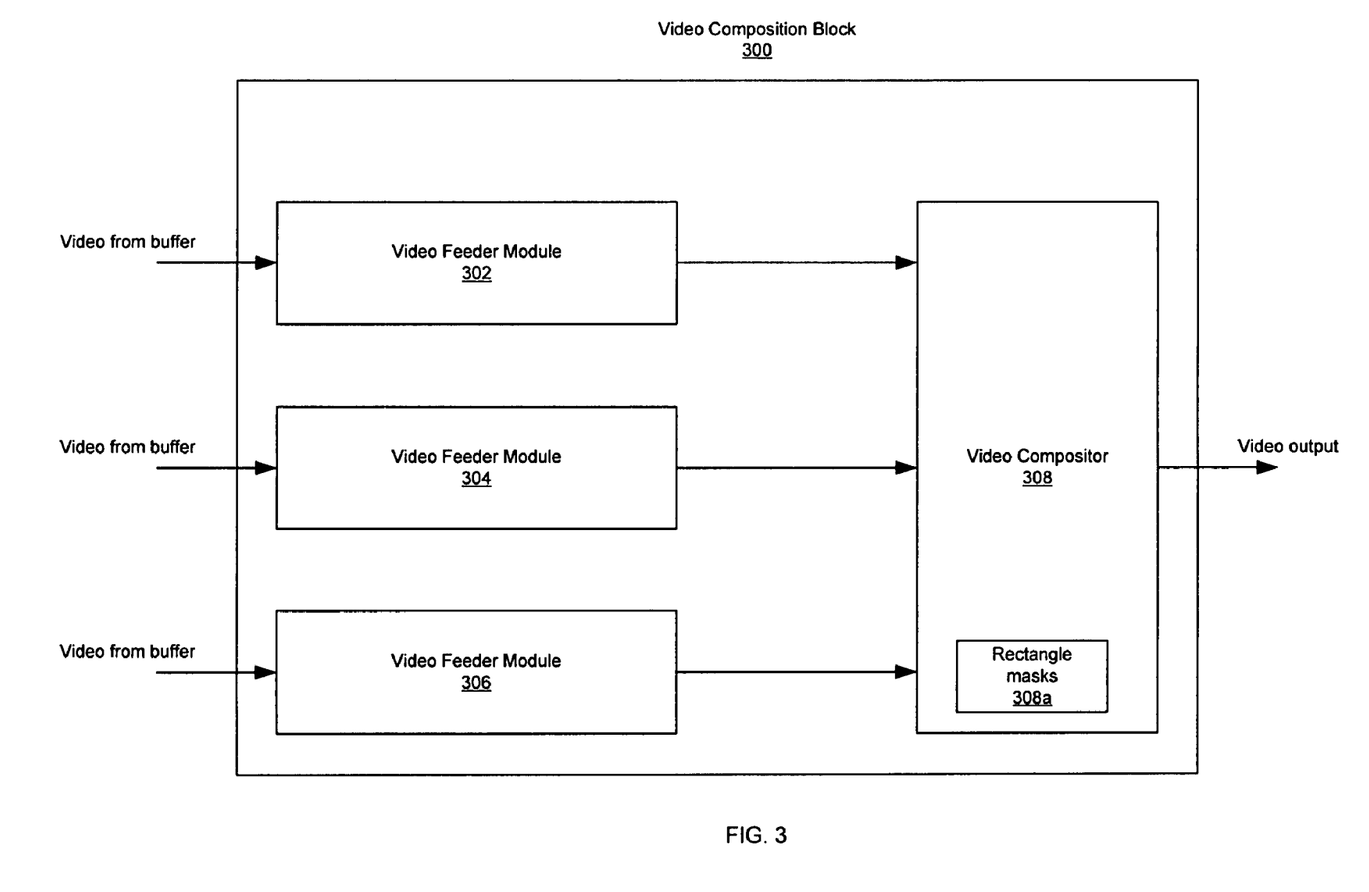
FIG. 3 is a block diagram illustrating an exemplary video composition block, in accordance with an embodiment of the invention.

FIG. 3 is a block diagram illustrating an exemplary video composition block, in accordance with an embodiment of the invention. Referring to FIG. 3, there is shown the video composition block 300, which may be similar to the video composition block 206. The video composition block 300 may comprise the video feeder modules 302, 304, 306, and the video compositor 308. The video compositor 308 may comprise rectangle masks 308a. The video feeder module 302, 304, or 306 may comprise suitable logic, circuitry, and/or code that may enable video processing, some of which may have been described with respect to FIG. 2.

While the number of video feeder modules may vary for different embodiments of the invention, three video feeder modules may be used with respect to FIG. 3 for explanatory purposes. For example, the video feeder module 302 may be used to generate an image for the main background. The video feeder module 304 may be used, for example, to generate an image for a smaller foreground area, such as, for example, during picture-in-picture displays. The video feeder module 306 may be used, for example, to generate graphics that may be overlaid over portions of the main background image and/or the smaller foreground image. This may comprise, for example, menu choices, channel identification, time display, and/or other graphics that may be displayed.

The video compositor 308 may comprise suitable logic, circuitry, and or code that may enable receiving of video data from at least one video feeder, such as, for example, from the video feeder modules 302, 304, and 306. The video compositor 308 may process video data from one or more video feeder modules such that a desired image may be displayed on a video screen, such as, for example, on a television or video monitor. The processing may comprise, for example, utilizing the rectangle masks 308a to determine which portions of the video data from the video feeder modules 302, 304, and 306 may be communicated to, for example, the VEC 208. This is explained in more detail with respect to FIGS. 6 and 8.

Figure 4:
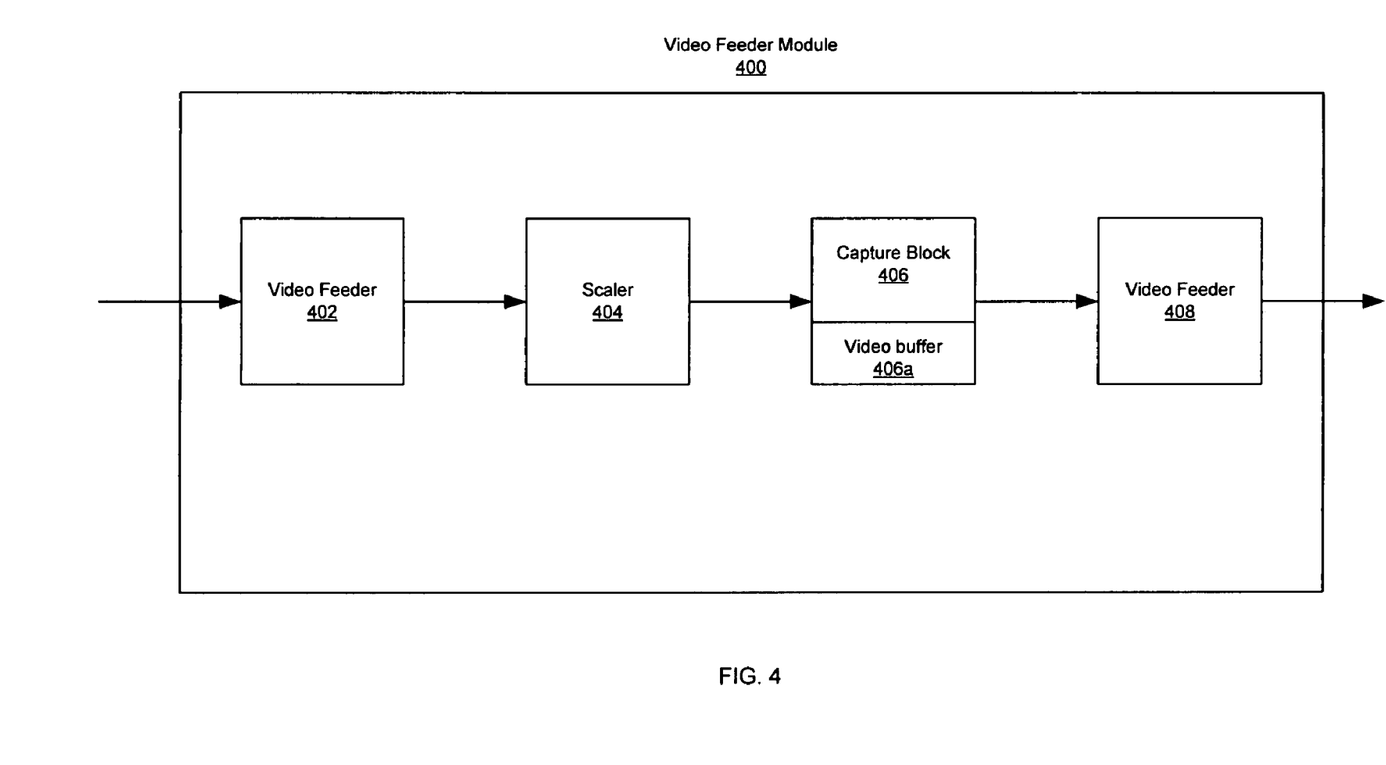
FIG. 4 is a block diagram illustrating an exemplary video feeder module, in accordance with an embodiment of the invention.

FIG. 4 is a block diagram illustrating an exemplary video feeder module, in accordance with an embodiment of the invention. Referring to FIG. 4, there is shown a video feeder module 400. The video feeder module 400 may be similar to the video feeder module 302, 304, or 306. The video feeder module 400 may comprise video feeders 402 and 408, a scaler 404, and a capture block 406. The capture block 406, which may be referred to as a capture module, may comprise a capture block video buffer 406a. The video feeders 402 or 408 may comprise suitable logic, circuitry, and/or code it may enable reading video data from video buffers, or other video storage devices, and communicating the pixels to a video processing module.

For example, the video feeder 402 may read video data from the video buffer 204 and communicate the video data to the scaler 404. The communication of video data may be by pixels, where the number of pixels delivered may be dependent on design and/or implementation of the video feeder interface. The video feeder 408 may read video data from the capture block 406, and may communicate the video data to, for example, the video compositor 308.

The scaler 404 may comprise suitable logic, circuitry, and/or code that may enable processing video data. For example, the scaler 404 may perform de-interlacing, digital filtering to up-scale or down-scale video data. De-interlacing may comprise receiving interlaced video data to form a single frame with data from two interlaced fields. Filtering for pixel reduction to down-scale video data may be, for example, bicubic filtering, which may use a quadratic average of a macroblock of pixels around a pixel of interest to reduce video resolution. Video resolution may also be up-scaled using various filtering methods. For example, bicubic interpolation may be used where an output pixel value may be a weighted average of pixels in a nearest 4-by-4 neighborhood.

The capture block 406 may comprise suitable logic, circuitry, and/or code that may enable receiving pixels from the scaler 404 and storing them in the capture block video buffer 406a. The pixels may be received, for example, by the capture block 406 at the same rate that the scaler 404 receives pixels. The received pixels may be stored in the capture block video buffer 406a such that the video data may be read sequentially in the order that it may be displayed on a monitor.

In operation, the video feeder 402 may read video data comprising pixels from the video buffer 204. The video feeder 402 may feed the video data to the scaler 404, for example, one pixel at a time. The scaler 404 may process the pixels appropriately to give a desired result. For example, if down-scaling is desired, the scaler 404 may receive the pixels from the video feeder 402, and process the pixels such that one pixel may be generated to replace a plurality of pixels. This may produce reduced resolution video data for an image, where the resolution may be less than that of the image whose corresponding video data may be read by the video feeder 402.

The scaler 404 may output pixels to the capture block 406 at the same rate at which it is receiving pixels from the video feeder 402. The capture block 406 may receive the individual pixels, generate corresponding blocks of data therefrom, and write the generated blocks of data to the capture block video buffer 406a. The generated blocks of data may be, for example, 32 bit words, 64 bit words, or other words that may comprise of a plurality bits. The video feeder 408 may perform similar operations as the video feeder 402. The video feeder 408 may read video data from the capture block 406 and may feed the pixels in the video data to, for example, the video compositor 308, one pixel at a time.

Although the capture block video buffer 406a may be described as being functionally a part of the capture block 406, the invention need not be so limited. For example, the capture block video buffer 406a may be part of another block of memory, such as, for example, the memory 104. While the capture block video buffer 406a may have been described as a single buffer, the invention need not be so limited. The capture block video buffer 406a may comprise a plurality of buffers. For example, if the capture block video buffer 406a comprises two buffers, then one buffer may be used to store data for a next frame that is to be displayed while the video data stored in the second buffer may be retrieved for the present frame.

Figure 5:
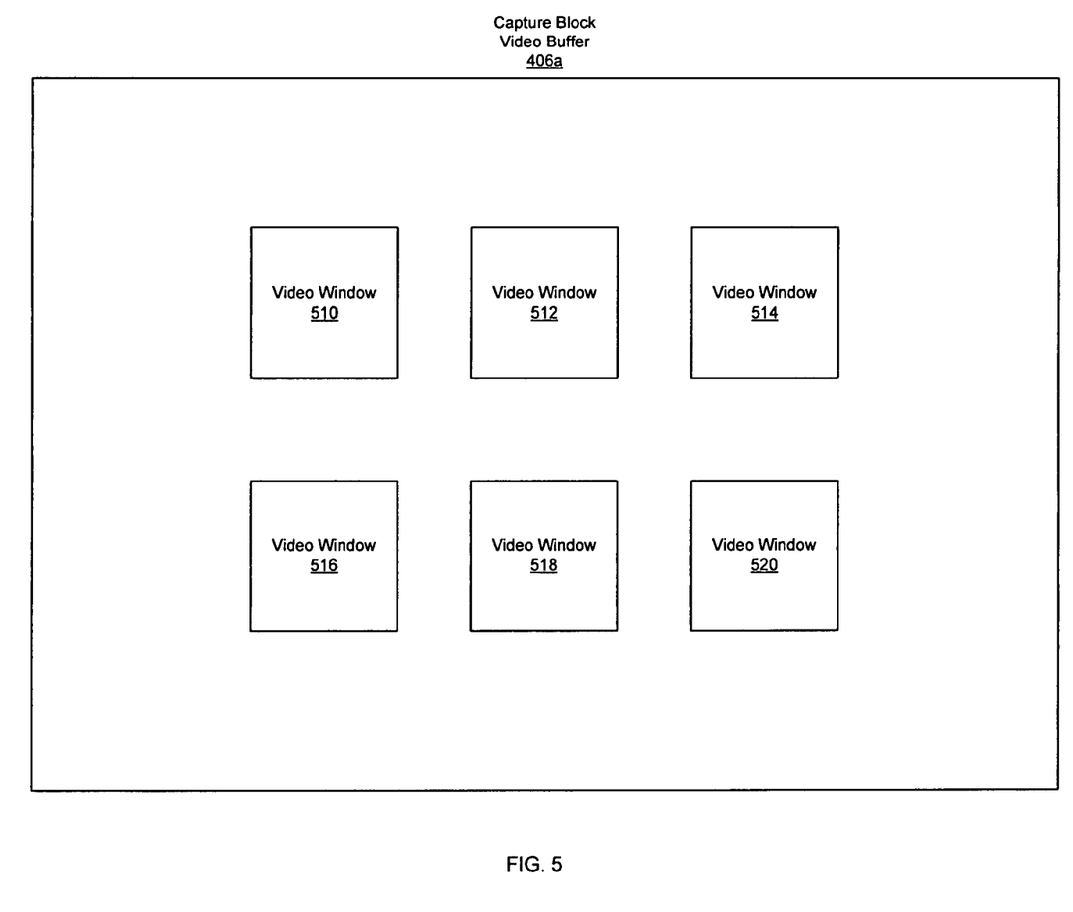
FIG. 5 is a diagram illustrating exemplary data in a capture block, in accordance with an embodiment of the invention.

FIG. 5 is a diagram illustrating exemplary data in a capture block, in accordance with an embodiment of the invention. Referring to FIG. 5, there is shown the capture block video buffer 500, which may be similar to the capture block video buffer 406a. The capture block video buffer 500 may comprise video memory that stores rows of pixels. Each row of pixels may correspond to, for example, a horizontal row of display in a video display. Accordingly, the capture block video buffer 500 may comprise a frame of video. The frame of video may be displayed on a video monitor, or a television, in one frame time.

There is also shown in FIG. 5 video windows 510, 512, 514, 516, 518, and 520. Data in each video window may be independent of data in other video windows. For example, video window 510 may be contents of "channel A," video window 512 may be contents of "channel B," video window 514 may be contents of "channel C," video window 516 may be contents of "channel D," video window 518 may be contents of "channel E," and video window 520 may be contents of "channel F." Displaying the plurality of video windows may be referred to as mosaic mode display of video. Also, while six video windows may have been described for ease of description, the invention need not be so limited. For example, a capture block may be able to store data for one or more video windows.

The capture block 406 may receive video data one pixel at a time from the scaler 404. The capture block 406 may, for example, gather one or more pixels to form a video word. The capture block 406 may then write the video word to an appropriate address in the capture block video buffer 500 until the capture block video buffer 500 has been updated for a frame. The updating of the capture block video buffer 500 may comprise video data written to at least a portion of the capture block video buffer 500. An embodiment of the invention may not put default data in a portion of the capture block video buffer 500 that is not updated. For example, if an address X is not updated, the data located at address X may be the last data that was written to that address. Other embodiments of the invention may write a default value, such as, for example, zeros, to addresses that are not updated for a present frame.

Figure 6:
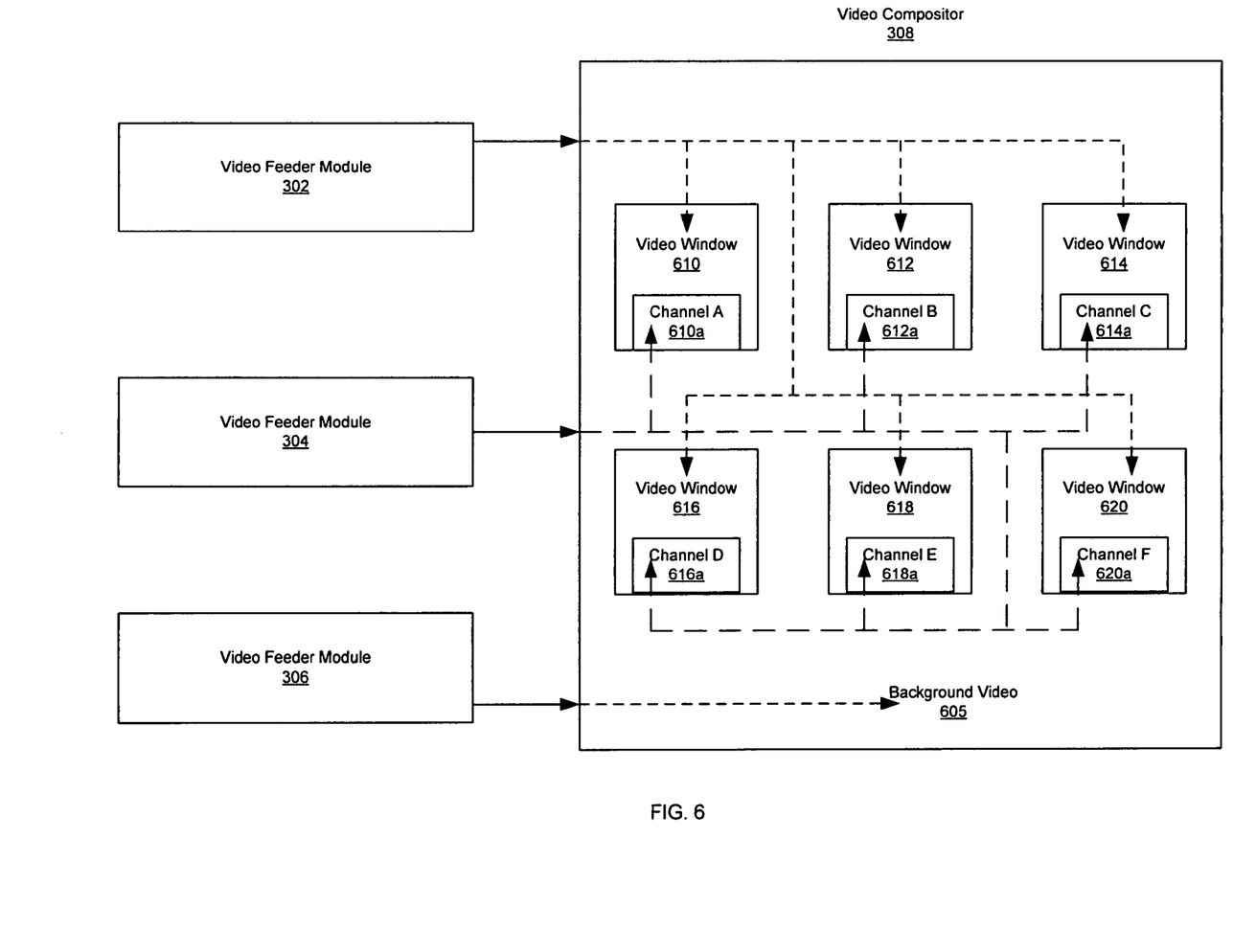
FIG. 6 is a diagram illustrating exemplary data in a video compositor, in accordance with an embodiment of the invention.

FIG. 6 is a diagram illustrating exemplary data in a video compositor, in accordance with an embodiment of the invention. Referring to FIG. 6, there is shown the video compositor 308. The video compositor 308 may receive video data from a plurality of video feeders, for example, the video feeder modules 302, 304, and 306. Each of the video feeder modules 302, 304, and 306 may transfer video data, for example, one pixel at a time to the video compositor 308.

The video compositor 308 may process the pixels from the video feeder modules 302, 304, and/or 306 to form processed video data. The video compositor 308 may then output the processed video data to, for example, the VEC 208. The processed video data may comprise information from a plurality of video feeders. For example, this may be illustrated with respect to the video windows 610, 612, 614, 616, 618, and 620. A video feeder from the video feeder module 302, for example, may have communicated video data from the capture block video buffer 500.

Another video feeder, for example, from the video feeder block 304 may communicate video data that may, for example, be corresponding graphics for each of the six video windows. For example, the second video feeder may send video data that may be used to display graphics 610a in the video window 610. The graphics may comprise, for example, "channel A" text and/or a logo for channel A. Similarly, video window 612 may have corresponding graphics 612a from the video feeder block 304 that may have graphics that comprises "channel A" text and/or a logo for channel A. The video windows 614, 616, 618, and 620 may also have corresponding graphics 614a, 616a, 618a, and 620a from, for example, the video feeder block 304.

Another video feeder, for example, from the video feeder block 306 may communicate video data that may, for example, display video from yet another channel. This video data may be used to display a background video 605. Accordingly, the video compositor 308 may process the video data from the three video feeders such that the graphics information 610a, 612a, 614a, 616a, 618a, and 620a may be transparently overlaid over the video windows 610, 612, 614, 616, 618, and 620, respectively. The video compositor 308 may also process the video data from the three video feeders such that the video windows 610, 612, 614, 616, 618, and 620 may opaquely overlay the background video 605.

In an embodiment of the invention, the video compositor 308 may also comprise the rectangle masks 308a that may store information for each video feeder block, for example, the video feeder modules 302, 304, and 306. The rectangle masks 308a may indicate portions of a capture block video buffer, for example, the capture block video buffer 500, which may have been updated with video data as valid regions. Accordingly, the video compositor 308 may output video data corresponding to the valid regions of the capture block video buffer 500 to the video compositor video buffer 600 while ignoring the video data from outside the valid regions. For example, if the third video feeder block did not have any video data to communicate to the video compositor 308, then the portion of the video compositor video buffer 600 labeled background video 605 may not be updated. Accordingly, the portion of the video compositor video buffer 600 labeled background video 605 may have video data from the previous frame it may have been updated. Some embodiments of the invention may have this capability, and therefore, may have access to video data for the previous frame.

Figure 7:
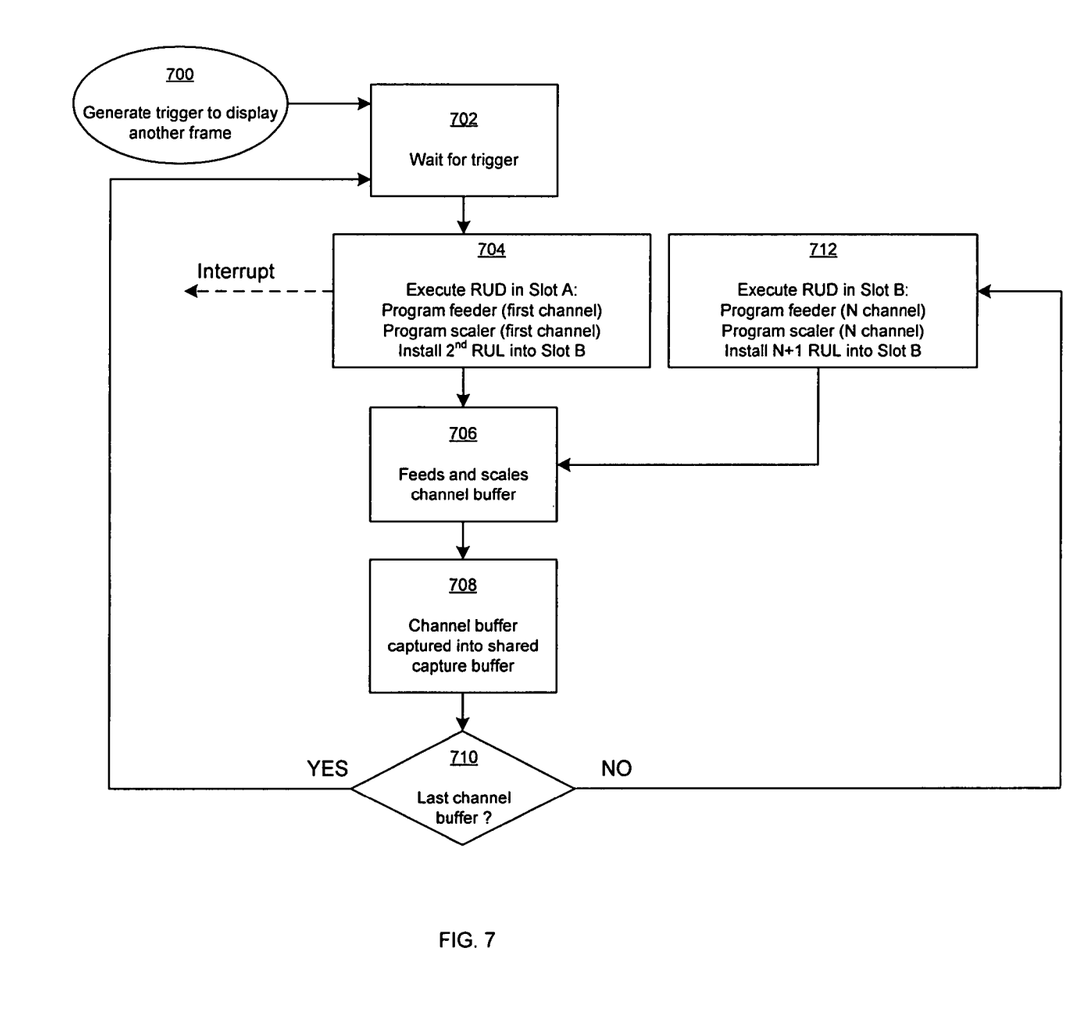
FIG. 7 is a flow chart illustrating exemplary steps for processing video, in accordance with an embodiment of the invention.

FIG. 7 is a flow chart illustrating exemplary steps for processing video, in accordance with an embodiment of the invention. Referring to FIG. 7, there is shown steps 700 to 712 that describe storing video data corresponding to, for example, the video windows 510 to 520 to the capture block video buffer 500. In step 700, the VEC 208 may generate a trigger to display processed video data for a next frame from, for example, the video compositor 308. The trigger may indicate that a last horizontal line of video data may have been displayed. Accordingly, the trigger may be, for example, the vertical blank signal generated by the VEC 208. In step 702, the RDMA controller 108a may be in an idle state waiting for a trigger to initiate RDMA transfers. The trigger to initiate the RDMA transfers may be, for example, the trigger generated by the VEC 208.

In step 704, the RDMA controller 108a may detect the trigger to initiate the RDMA transfers. Accordingly, the RDMA controller 108a may start transfer of register update data (RUD) for the first video window, for example, video window 510 that may be generated from video data from channel A. The RUD for the first video window may be stored in a portion of memory, for example, the memory 104, that may be referred to as "Slot A," and whose start address may be known to the RDMA controller 108a. Since each video window may be generated from a different channel, which may have different video characteristics than other video windows generated from different channels, the video processor block 108 may be configured differently for each video window. Accordingly, a separate RUD may be available for each video window. The RUDs may be stored, for example, in a linked list where each member of the linked list may comprise a RUD corresponding in order to each of the video windows. An exemplary embodiment of the RUD is explained in more detail with respect to FIG. 12.

The configuring of the video block 108 with a RUD may comprise, for example, configuring the video feeder 402 to fetch appropriate video data from the video buffer 204, and the scaler 404 to appropriately scale the video data from the video buffer 402. The video feeder 402 may, for example, be configured to communicate a cropped portion of the video data for channel A. The scaler 404 may scale the video data from the video feeder 402.

For example, if the resolution for the video data for channel A is the same as the resolution for display by a television set, then the scaler may not have to scale the video data resolution. Accordingly, the RUD for this video window may configure the video processor block 108 such that video data in a corresponding video buffer for this video window may not be scaled. Another channel may have a video resolution that may be greater than desired. Accordingly, the RUD for this video window may configure the video processor block 108 such that the video feeder 402 may communicate a portion of the video data in the video buffer 204 such that the video data may correspond to a cropped image.

The RDMA controller 108a may copy the RUD for the second video window in a portion of memory, for example, the memory 104, that may be referred to as "Slot B," and whose start address may be known to the RDMA controller 108a. In this manner, the RDMA controller 108a may transfer the RUD for the second video window as needed. The RDMA controller 108a may also generate an interrupt that may be serviced by, for example, the processor 106. The execution of the interrupt service routine 104b is described with respect to FIGS. 9A and 9B.

In step 706, the video feeder 402 may feed video data to the scaler 404, and the scaler 404 may scale the video data as configured with the RUD. The. In step 708, the scaled video data from the video scaler 404 may be stored in the capture block video buffer 500. In step 710, the RDMA controller 108a may determine whether the data transferred was for the last video window. If so, the capture block video buffer 500 may contain data for the video windows 510 to 520 to be displayed for this frame of video, and the next step may be step 702. Otherwise, the next step may be step 712.

In step 712, the RUD may be transferred from the slot B to configure the video processor block 108. The RUD from the next member of the linked list of RUDs may be copied to the slot B for the next video window. The next step may be step 706.

While an embodiment of the invention may have been described as using a linked list of RUDs, the invention need not be so limited. For example, the RUDs may be written sequentially in memory such that the start of each RUD may be at a known address. Each RUD may be written to a constant size memory space, or there may be data that may indicate end of a present RUD. Accordingly, address of the next RUD may be able to be determined. Additionally, while slots A and B may have been used to copy the first RUD and successive RUDs, respectively, the invention need not be so limited. For example, the RUD may be copied directly from where the RUDs were originally stored without copying them to slots A and B.

Figure 8:
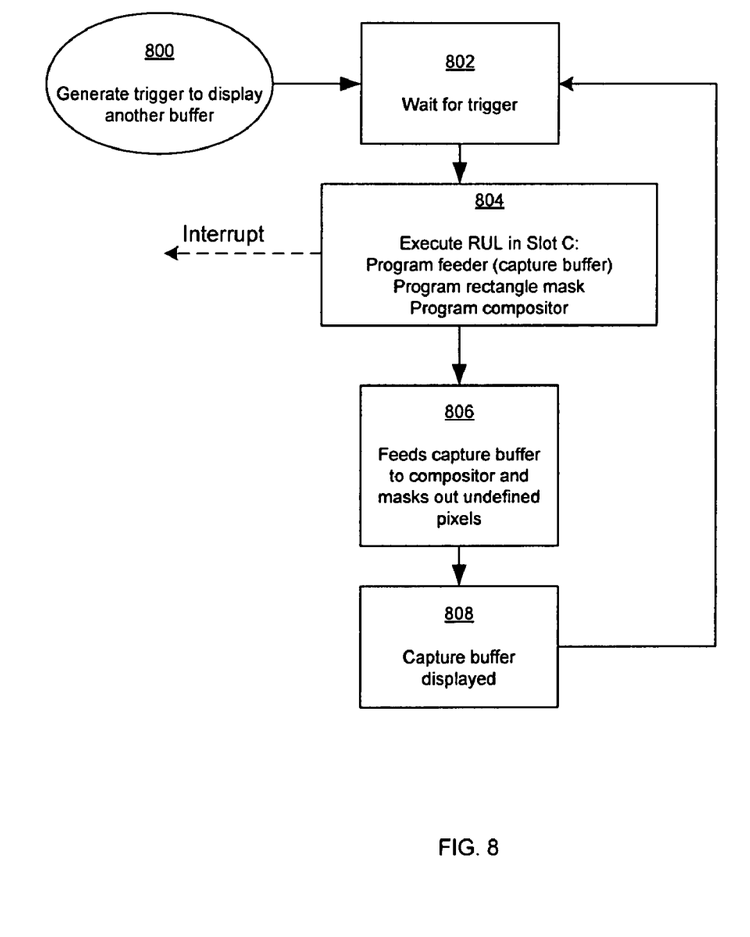
FIG. 8 is a flow chart illustrating exemplary steps for processing video, in accordance with an embodiment of the invention.

FIG. 8 is a flow chart illustrating exemplary steps for processing video, in accordance with an embodiment of the invention. Referring to FIG. 8, there is shown steps 800 to 808 that describes transfer of video data from the capture block video buffer 500 to the video compositor 308. In step 800, the VEC 208 may generate a trigger to display video data for a next frame from, for example, the video compositor 308. The trigger may indicate that a last horizontal line of video data may have been displayed. Accordingly, the trigger may be, for example, the vertical blank signal generated by the VEC 208. In step 802, the RDMA controller 108a may be in an idle state waiting for a trigger to initiate RDMA transfers. The trigger to initiate the RDMA transfers may be, for example, the trigger generated by the VEC 208.

In step 804, the RDMA controller 108a may detect the trigger to initiate the RDMA transfers. Accordingly, the RDMA controller 108a may start transfer of register update data (RUD) for transfer of video data from the capture block video buffer 500 to the video compositor 308. This RUD may be stored in a portion of memory, for example, the memory 104, that may be referred to as "Slot C," and whose start address may be known to the RDMA controller 108a. Since video data may be transferred to the video compositor 308 for a frame at a time, only one RUD may be used to transfer video data to the video compositor 308.

The configuring of the video block 108 with a RUD may comprise, for example, configuring each video feeder 408 for the video feeder modules 302 . . . 306 to fetch video data from the corresponding capture block video buffer 500, and the video compositor 308. The video compositor 308 may be, for example, configured with appropriate data for the rectangle masks 308a as well as data on how to merge the video data from the various video feeders 408 in the video compositor video buffer 600.

The RDMA controller 108a may also generate an interrupt that may be serviced by, for example, the processor 106. The execution of the interrupt service routine 104b is described with respect to FIGS. 9A and 9B.

In step 806, the video feeders 408 may feed video to the video compositor 308, and the video compositor 308 may appropriately process the video data as configured by the RUD. In step 808, the video feeder 408 may feed video data from the capture block 406 to, for example, the VEC 208. The next step may be step 802.

Figure 9A:
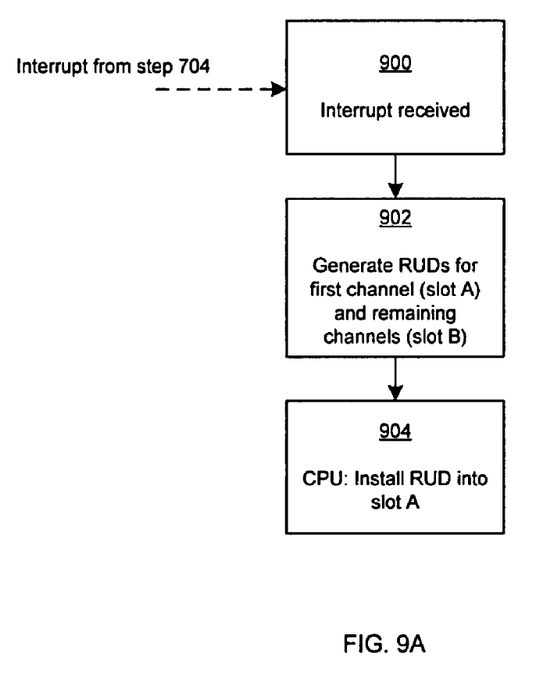
FIG. 9A is a flow chart illustrating exemplary steps for processing video, in accordance with an embodiment of the invention.

FIG. 9A is a flow chart illustrating exemplary steps for processing video, in accordance with an embodiment of the invention. Referring to FIG. 9A, there is shown steps 900 to 904 for handling an interrupt generated during storing of video data to the capture block 406. In step 900, the processor, for example, the processor 106 may service the interrupt by starting execution of, for example, the interrupt service routine 104b. In step 902, the interrupt service routine 104b may call the VDC 104c, and the VDC 104c may generate RUDs for generating the various video windows that may correspond to various channels for the next video frame. In step 904, the processor may store the RUD for the first video window in slot A.

Figure 9B:
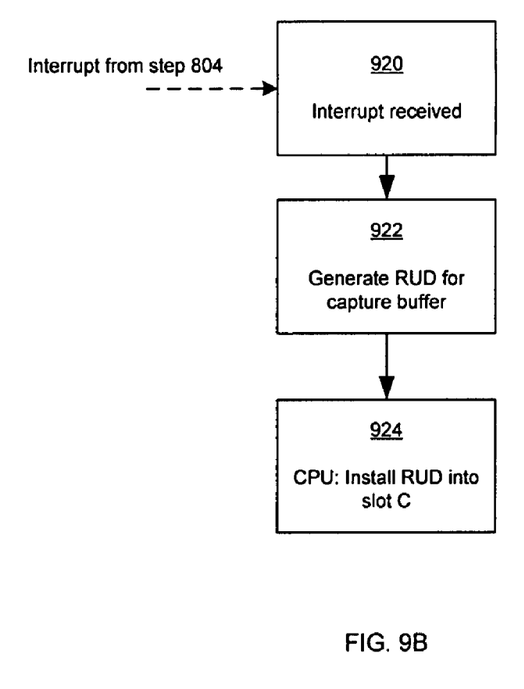
FIG. 9B is a flow chart illustrating exemplary steps for processing video, in accordance with an embodiment of the invention.

FIG. 9B is a flow chart illustrating exemplary steps for processing video, in accordance with an embodiment of the invention. Referring to FIG. 9B, there is shown steps 920 to 924 for handling an interrupt generated during storing of video data to the video compositor 308. In step 920, the processor, for example, the processor 106 may service the interrupt by starting execution of, for example, the interrupt service routine 104b. In step 922, the interrupt service routine 104b may call the VDC 104c, and the VDC 104c may generate the RUD that may be used to store video data for the next video frame in the video compositor 308. In step 904, the processor may store the RUD in slot C.

While FIGS. 9A and 9B may have described the interrupt service routine calling the VDC 104c, the invention need not be so limited. For example, while the VDC 104c may be a separate routine, it may also be part of the interrupt service routine 104b.

Figure 10:
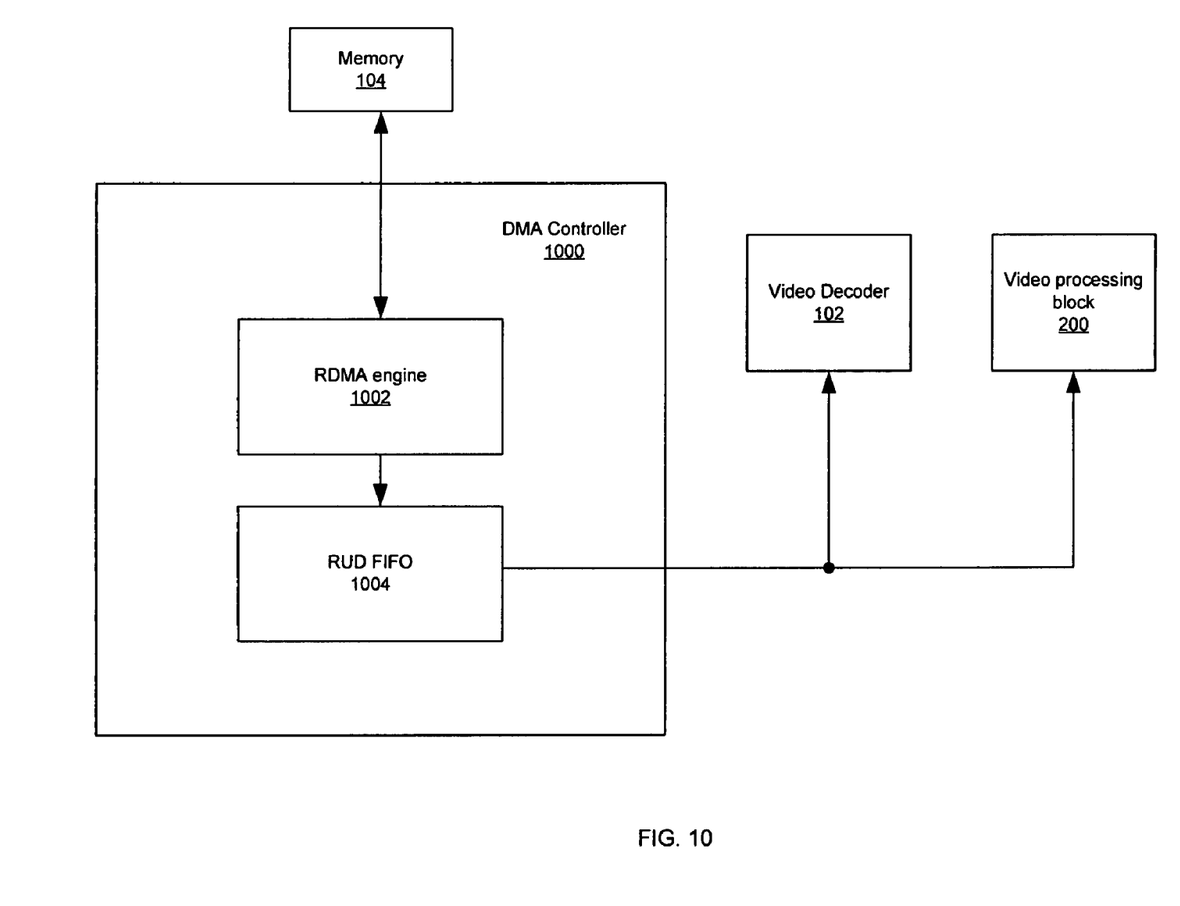
FIG. 10 is a block diagram of an exemplary RDMA controller, in accordance with an embodiment of the invention.

FIG. 10 is a block diagram of an exemplary RDMA controller, in accordance with an embodiment of the invention. Referring to FIG. 10, there is shown a RDMA controller 1000, the video decoder 102, the memory 104, and the video processing module 200. The RDMA controller 1000 may comprise a RDMA engine 1002 and a RUD FIFO 1004. The RDMA controller 1000 may comprise suitable logic, circuitry, and/or code that may enable transfer of data from memory to one or more devices. For example, the RDMA controller 1000 may transfer data from the memory 104 to, for example, the video decoder 102 and the video processing module 200. The video decoder 102 may be configured to use H.264/MPEG4 AVC standard for decoding video data and the video processor block 108 may be configured to down-scale video data. The configuration information may be written to various registers to control operation of, for example, the video decoder 102 and/or the video processor block 108.

The RDMA engine 1002 may comprise suitable logic, circuitry, and/or code that may enable reading data from memory, such as, for example, the memory 104. The memory 104 may be accessed, for example, via a memory bus (not labeled). The RUD FIFO 1004 may comprise suitable logic, circuitry, and/or code that may enable storing data read by the RDMA engine 1002, and outputting data to be written to various registers for controlling video processing.

In one embodiment of the invention, the RDMA engine 1002 may have a register that may indicate the address of the slot A, a register that may indicate the address of slot B, and a register that may indicate the address of slot C. Accordingly, the RDMA engine 1002 may use the appropriate address to transfer data to the RUD FIFO as discussed with respect to FIGS. 7-9B. The plurality of RUDs for video data transfer to the capture block 406 may be configured as a linked list, where each RUD may comprise data for configuring for a specific video channel. For example, each of the six video windows 510, 512, 514, 516, 518, and 520 may be processed according to different RUDs. Accordingly, there may be six members in a linked list corresponding to the six video windows 510, 512, 514, 516, 518, and 520.

A triggering event may enable start of the RDMA transfers. A suitable triggering event may be, for example, the vertical blank signal generated by the VEC 208 that may indicate end of a frame. If the present RUD is not, for example, the last member of a linked list, the RDMA controller 1000 may parse information from the present RUD to copy data from the next RUD to slot B. The RDMA transfer for the next RUD may start after the RDMA transfer of the present RUD is finished.

RDMA transfer of RUD data to various registers of, for example, the video processing block 108 may configure the video processing block 108 for specific video processing operations. For example, the video processing block 108 may be configured to process only a portion of video data in, for example, the video buffer 104a. The video processing block 108 may also be used to down-scale or upscale video data from, for example, the video buffer 104a.

Since not all registers may need to be updated with new data, a RUD may comprise data that may be used to process a current and a next stream of video data, for example. Accordingly, if scaling does not need to change from generation of video data for one video window to the next video window, then registers in the video processing block 108 that affect scaling may not need to be updated.

Figure 11:
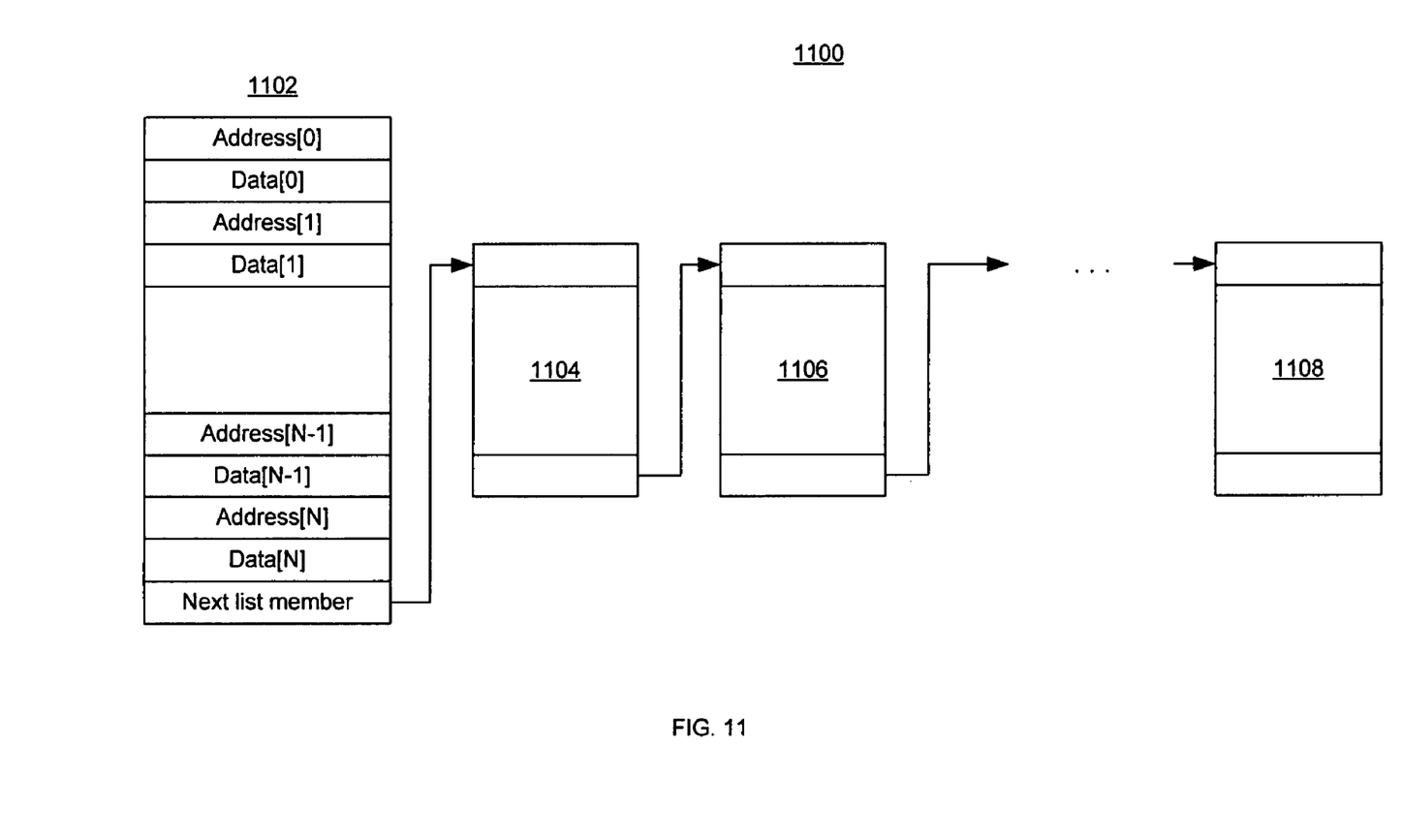
FIG. 11 is a diagram illustrating exemplary linked list of register update data, in accordance with an embodiment of the invention.

FIG. 11 is a diagram illustrating exemplary linked list of register update data, in accordance with an embodiment of the invention. Referring to FIG. 11, there is shown a linked list 1100 comprising a plurality of list members 1102, 1104, 1106, and 1108. Each list member may be a RUD comprising register addresses and corresponding data to be written to those addresses. The RUD may also have data indicating an address of the next list member. If there is no valid address for the next list member, the RDMA controller 1000 may generate an interrupt after the last RDMA transfer for the RUD or after the last transfer of the RUD data to a register.

Each list member 1102, 1104, 1106, or 1108 may comprise, for example, a register address followed by corresponding data for that register address. For example, the RUD may be configured such that an address Address[0] may be followed by Data[0]. Then the next address and data may follow, for example, Address[1] and Data[1]. This may continue to the last register address Address[N] and data Data[N]. The RUD may then comprise a start address and end address of the next list member. If there is no next list member, then an embodiment of the invention may fill the start address and end address values with a default value, such as, for example, zero.

Upon transferring the last data from memory, for example, the memory 104, the RDMA controller 1000 may parse the start and end addresses for the next list member. If the addresses are non-zero, the RDMA controller 1000 may configure start and end address registers with the addresses in the list member. If the addresses are zero, then the RDMA controller 1000 may generate an interrupt to, for example, the processor 106.

In accordance with an embodiment of the invention, aspects of an exemplary system may comprise a single video feeder block, such as, for example, the video feeder module 400 that enables generation of video data for a plurality of video windows, such as, for example, the video windows 510, 512, 514, 516, 518, and 520. The video feeder module 400 may comprise a single scaler 404 and/or a single capture block 406. The video data for the plurality of video windows may be updated in a single frame time. The processor 106 may generate a plurality of register update data for the video windows, where each register update data may correspond to a different video window. The register update data may be configured as, for example, a linked list or sequentially stored. The register update data may be used to write appropriate values to a plurality of registers that may need to be configured for video processing. The register DMA controller 108a may be used to transfer register update data to the registers to configure video processing prior to generating video data for the present video window.

The processor 106 may generate the register update data for a subsequent frame in response to a single interrupt generated by the capture. The interrupt may be generated, for example, by the capture block 406 when it stores the last pixel of the last video window for the present frame. After the last pixel for a video window, which may not be the last video window for the frame, may be stored in the capture block video buffer 500, the register DMA controller 108a may enable automatically configure the video processing for a new video window using corresponding register update data.

Another embodiment of the invention may provide a machine-readable storage, having stored thereon, a computer program having at least one code section executable by a machine, thereby causing the machine to perform the steps as described above for mosaic mode display of video.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing video, the method comprising:
    performing by one or more processors and/or circuits within a video processing system, wherein said one or more processors and/or circuits comprise a single video feeder:
        generating video data for a plurality of video windows using said single video feeder, wherein said video data for said plurality of video windows is generated in a single frame time;
        generating a plurality of register update data for said plurality of video windows and a video compositor, wherein each of said plurality of register update data corresponds to said video compositor and to a different one of said plurality of video windows, and said one or more processors and/or circuits comprises said video compositor; and
        generating said plurality of register update data for a subsequent frame in response to a single interrupt.

2. The method according to claim 1, comprising utilizing a register direct memory access (DMA) transfer of said plurality of register update data to configure video processing to generate said video data for said plurality of video windows.

3. The method according to claim 1, comprising configuring video processing with data in one of said plurality of register update data prior to generating said video data for said corresponding video window.

4. The method according to claim 3, comprising configuring automatically said video processing for a new video window using new register update data after processing data for a present video window.

5. The method according to claim 1, comprising configuring said plurality of register update data as a linked list.

6. The method according to claim 1, comprising storing sequentially said plurality of register update data.

7. The method according to claim 1, wherein said video feeder comprises a single video scaler.

8. The method according to claim 1, wherein said video feeder comprises a single video capture circuit.

9. A system for processing video, the system comprising:
    one or more processors and/or circuits that comprise a single video feeder, said one or more processors and/or circuits are operable to generate video data for a plurality of video windows, wherein said video data for said plurality of video windows is generated in a single frame time;
    said one or more processors and/or circuits comprise a processor and a video compositor, said one or more processors and/or circuits are operable to generate a plurality of register update data for said video compositor and said plurality of video windows, wherein each of said plurality of register update data corresponds to said video compositor and a different one of said plurality of video windows; and
    said one or more processors and/or circuits are operable to generate said plurality of register update data for a subsequent frame in response to a single interrupt.

10. The system according to claim 9, wherein said one or more processors and/or circuits comprise a register direct memory access (DMA) controller that enables transfer of said each of said plurality of register update data to configure video processing to generate said video data for said one of said plurality of video windows.

11. The system according to claim 9, wherein said one or more circuits comprise a register DMA controller that is operable to configure video processing with data in one of said plurality of register update data prior to generating said video data for said corresponding video window.

12. The system according to claim 11, wherein said register DMA controller is operable to automatically configure said video processing for a new video window using new register update data after processing data for a present video window.

13. The system according to claim 9, wherein said processor is operable to configure said plurality of register update data as a linked list.

14. The system according to claim 9, wherein said processor is operable to sequentially store said plurality of register update data.

15. The system according to claim 9, wherein said video feeder comprises a single video scaler.

16. The system according to claim 9, wherein said video feeder comprises a single video capture circuit.

17. A method for processing video, the method comprising:
    performing by one or more processors and/or circuits within a video processing system, wherein said one or more processors and/or circuits comprise a single video feeder:
        generating video data for a plurality of video windows using said single video feeder, wherein said video data for said plurality of video windows is generated in a single frame time;
        generating a plurality of register update data for said plurality of video windows and a video compositor, wherein each of said plurality of register update data corresponds to said video compositor and to a different one of said plurality of video windows, and said one or more processors and/or circuits comprises said video compositor; and configuring video processing with data in one of said plurality of register update data prior to generating said video data for said corresponding video window.

18. The method according to claim 17, comprising utilizing a register direct memory access (DMA) transfer of said plurality of register update data to configure video processing to generate said video data for said plurality of video windows.

19. The method according to claim 17, comprising configuring automatically said video processing for a new video window using new register update data after processing data for a present video window.

20. The method according to claim 17, comprising configuring said plurality of register update data as a linked list.

21. The method according to claim 17, comprising storing sequentially said plurality of register update data.

22. The method according to claim 17, wherein said video feeder comprises a single video scaler.

23. The method according to claim 17, wherein said video feeder comprises a single video capture circuit.

24. A system for processing video, the system comprising:
one or more processors and/or circuits that comprise a single video feeder, said one or more processors and/or circuits are operable to generate video data for a plurality of video windows, wherein said video data for said plurality of video windows is generated in a single frame time;

said one or more processors and/or circuits comprise a processor and a video compositor, said one or more processors and/or circuits are operable to generate a plurality of register update data for said video compositor and said plurality of video windows, wherein each of said plurality of register update data corresponds to said video compositor and a different one of said plurality of video windows; and said one or more circuits comprise a register DMA controller that is operable to configure video processing with data in one of said plurality of register update data prior to generating said video data for said corresponding video window.

25. The system according to claim 24, wherein said one or more processors and/or circuits comprise a register direct memory access (DMA) controller that enables transfer of said each of said plurality of register update data to configure video processing to generate said video data for said one of said plurality of video windows.

26. The system according to claim 24, wherein said register DMA controller is operable to automatically configure said video processing for a new video window using new register update data after processing data for a present video window.

27. The system according to claim 24, wherein said processor is operable to configure said plurality of register update data as a linked list.

28. The system according to claim 24, wherein said processor is operable to sequentially store said plurality of register update data.

29. The system according to claim 24, wherein said video feeder comprises a single video scaler.

30. The system according to claim 24, wherein said video feeder comprises a single video capture circuit.

* * * * *